United States Patent Office 3,647,702
Patented Mar. 7, 1972

3,647,702
LIQUID EUTECTIC MIXTURES OF ORTHO-TOLYL-
ENEDIAMINE, META-TOLYLENEDIAMINE AND
BIS(AMINOPHENYL)METHANE
Louis F. Cole, Chicago, Ill., assignor to Union Carbide
Corporation, New York, N.Y.
No Drawing. Continuation-in-part of application Ser. No.
628,263, Apr. 4, 1967, now Patent No. 3,546,169. This
application Mar. 20, 1970, Ser. No. 21,482
Int. Cl. C08g 51/84
U.S. Cl. 252—182
16 Claims

ABSTRACT OF THE DISCLOSURE

This application relates to liquid eutectic mixtures of ortho - tolylenediamine, meta - tolylenediamine and bis (aminophenyl)methane which are particularly useful as curing agents for polyepoxides.

---

This application is a continuation-in-part application of my copending application Ser. No. 628,263 filed Apr. 4, 1967, now Pat. No. 3,546,169.

This invention relates to liquid eutectics comprising a mixture of o-tolylenediamine, m-tolylenediamine and bis (aminophenyl)methane which are characterized by excellent shelf life or stability and are particularly desirable for use as latent hardeners for polyepoxide. Polyepoxisde compositions, containing the liquid eutectic mixtures of this invention, can be easily compounded with other materials to provide compositions of desired formulation having excellent storage life and from which infusible products can be obtained having excellent physical, chemical and electrical properties.

Polyepoxide compositions, such as those based on polyglyidyl ethers of polyhydric phenols, having an epoxy equivalency of greater than one, generally contain an aromatic polyfunctional amine as the curing agent as the resultant compositions will cure to infusible products which are characterized by excellent physical, chemical and electrical properties. The polyglycidyl ethers are usually admixed with a measured amount of an aromatic polyfunctional amine ranging from about 90 percent of stoichiometric to about 15 percent in excess of stoichiometric and the compositions utilized as desired, for example, in casting applications. Because of the high reactivity of these polyfunctional amines toward the polyglycidyl ethers, however, the curing reaction commences immediately upon admixing of the two materials. Consequently, polyglycidyl ethers containing these polyfunctional amines "fast cure," that is, these compositions cure to infusible products in a relatively short period of time.

The problem of "fast cure" has presented many obvious difficulties since it is not always possible to use these polyglycidyl ether compositions immediately upon formulation. In most instances, these polyglycidyl ether compositions cure before they can be used in the desired manner.

Various suggestions have been made for purposes of improving the relatively poor storage life of curable polyglycidyl ether compositions. For example, it has been suggested to add to the polyglycidyl ether compositions a compound which is unreactive per se, but one which under the impetus of heat will become activated and react with the polyglycidyl ethers with the result that the compositions will cure to infusible products. Latent acting compounds, particularly of the type described, have proved to be undesirable because of the uncertainty and unpredictability of the "activation reaction." As an illustration, a small variation in the amount of heat imparted to the compositions during the "activation" cycle can seriously affect the extent to which the activation reaction proceeds and, consequently, the amount of "activated compound" formed.

The present invention provides liquid eutectic mixtures of o-tolylenediamine, m-tolylenediamine and bis(aminophenyl)methane which when added to polyepoxides result in the formulation of compositions which have excellent storage life, but once used in the desired manner, for instance in casting applications, will cure to infusible products characterized by improved properties.

The liquid eutectics of this invention remain stable, at room temperature, about 23° C., over prolonged periods of time, and being liquids can be admixed with polyepoxides to form homogeneous mixtures without first being subjected to additional processing steps. For example, when it is desired to blend a solid hardener with a solid polyepoxide, it is customary to first heat the hardener to a fluid state and then admix the fluid hardener with the solid polyepoxide.

The liquid eutectics of this invention, as stated comprise a mixture of o-tolylenediamine, m-tolylenediamine and bis(aminophenyl)methane. Generally, the liquid eutectics of this invention are made up of the named components in the following amount wherein parts by weight are based on each 100 parts by weight of the mixtures (a)+(b):

Component (a)—about 35 to about 45 parts by weight of a mixture of o-tolylenediamine and m-tolylenediamine wherein the o-tolylenediamine is present in an amount of about 60 to about 70 percent by weight and the m-tolylenediamine is present in an amount of about 30 to about 40 percent by weight, based on the combined weight of the o-tolylenediamine and m-tolylenediamine and Component (b)—about 55 to about 65 parts by weight of bis(aminophenyl)methane.

The term m-tolylenediamine as used herein encompasses 2,4; 3,5; and 2,6-diaminotoluene and mixtures thereof.

The term o-tolylenediamine as used herein encompasses 2,3-diaminotoluene, 3,4-diaminotoluene and mixtures thereof.

The term bis(aminophenyl)methane as used herein encompasses bis(p - aminophenyl)methane, bis(o - aminophenyl)methane, bis(m - aminophenyl)methane, mixed isomers thereof such as 2,4'-diaminodiphenyl methane as well as mixtures of these compounds.

The polyepoxides which can be cured with the liquid eutectics of this invention are those organic compounds having an oxirane epoxy equivalency of greater than one, that is, compounds having an average of more than one oxirane epoxy group i.e.,

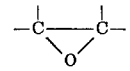

per molecule. These compounds, wherein the oxygen of the epoxy group is attached to vicinal carbon atoms, can be saturated or unsaturated, aliphatic, cycloaliphatic, or heterocycle, and can be substituted with substituents such as halogen atoms, alkyl groups, ether groups and the like.

Illustrative of suitable polyepoxides are the polyglycidyl ethers of polyhydric phenols, exemplified by the polyglycidyl ethers of such phenols as the mononuclear polyhydric phenols, resorcinol and pyrogallol, the di- or polynuclear phenols, such as the bisphenols described in Bender et al., U.S. Pat. 2,506,486 and polyphenylols such as the novolak condensates of a phenol and a saturated or unsaturated aldehyde containing an average of from 3 to 20 or more phenylol groups per molecule (cf. "Phenoplasts" by T. S. Carswell, published in 1947 by Interscience Publishers, New York). Exemplary of suitable polyphenylols derived from a phenol and an unsaturated aldehyde such as acrolein are the triphenylols, pentaphenylols, and heptaphenylols described in U.S. Pat. 2,885,385 to A. G. Farnham. The phenols may contain substituents such as alkyl or aryl ring substituents or halogens, as exemplified by the alkyl resorcinols, tribromoresorcinol, and the bisphenols containing alkyl and halogen substituents on the aromatic ring (Bender et al., U.S. Pat. 2,506,486). The polyhydric polynuclear phenols can consist of two or more phenols connected by such groups as methylene, alkylene or sulfone. The connecting groups are further exemplified by bis(p-hydroxyphenyl)methane, 2,2-bis(p-hydroxyphenyl)propane, and dihydroxydiphenylsulfone.

Process for the preparation of polyglycidyl ethers of polyhydric phenols is described in detail in the Bender et al. patent (supra) and U.S. Pat. 2,943,095 to A. G. Farnham et al.

Particularly desirable for purposes of this invention are the polyglycidyl ethers of the bis(hydroxyphenyl)alkanes, for example, the diglycidyl ether of 2,2-bis(p-hydroxyphenyl)propane, and the diglycidyl ether of bis(p-hydroxyphenyl)methane. Other suitable polyglycidyl ethers of polyhydric phenols are enumerated in U.S. Pat. 2,633,458 to E. C. Shokal.

Also suitable are the polyglycidyl ethers of polyhydric alcohols, such as the reaction products of epichlorohydrin and aliphatic compounds containing from two to four alcoholic hydroxyl groups, such as ethylene glycol, propane diols, butane diols, glycerine, hexane triols and the like. Methods of preparing polyglycidyl ethers of polyhydric alcohols are described in U.S. Pat. 2,898,349 to P. Zuppinger et al.

Other suitable polyglycidyl compounds are the polyglycidyl esters of polycarboxylic acids, such as the polyglycidyl esters of adipic acid, phthalic acid and the like. Polyglycidyl esters of polycarboxylic acids are described in detail in U.S. Pat. 2,870,170 to Payne et al. Also suitable are polyglycidyl compounds produced by reacting epichlorohydrin with aromatic amines, such as aniline, 2,6-dimethylaniline, p-toluidine, m-chloroaniline, p-aminodiphenyl, m - phenylene diamine, p - phenylene diamine, 4,4'-diaminodiphenyl methane, or with amino phenols such as p-amino phenol, 5-amino-1-n-naphthol, 4-amino resorcinol, 2-methyl-4-amino phenol, 2-chloro-4-amino phenol and the like. Specific compounds include among others, N,N - diglycidyl aniline, N,N - diglycidyl-2,6-dimethyl aniline, N,N,N',N'-tetraglycidyl-4,4'-diamino diphenyl methane, the triglycidyl derivative of p-amino phenol wherein the aminohydrogen and OH hydrogen atoms are replaced by glycidyl groups.

Polyglycidyl derivatives of aromatic amines and amino phenols and methods for their preparation are further described in U.S. Pats. 2,951,825 and 2,951,822 to N. H. Reinking and N. H. Reinking et al. respectively.

The so-called peracetic acid epoxides which are obtained by epoxidation across a double bond, such as bis-(2,3 - epoxycyclopentyl)ether, 3,4-epoxy-6-methylcyclohexylmethyl-3,4-epoxy-6-methylcyclohexane carboxylate, vinylcyclohexene dioxide, dicyclopentadienedioxide and the like are also suitable.

The amount of the liquid eutectic mixtures of this invention used with the polyepoxides is sufficient to cure the polyepoxides to infusible products. As a rule, amounts generally used range from about 70 percent of stoichiometric to about 20 percent in excess of stoichiometric. Optimum properties in cured polyepoxide compositions are achieved using about a stoichiometric amount of the liquid eutectic mixtures. For purposes of stoichiometric calculations, one epoxy group:

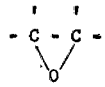

is deemed to react with one amino hydrogen atom.

The polyepoxide compositions are cured by being heated at elevated temperatures, generally on the order of about 75° C. to about 150° C. for about 2 to 6 hours. The exact curing cycle will vary and depend upon the formulation of the composition.

Additional materials such as fillers, pigments, fibers, dyes and the like can be added to the liquid eutectics and/or the polyepoxide compositions, if so desired. The resultant compositions can be used in all applications in which polyepoxide compositions have found use in the past, as for example in casting applications to encapsulate electrical components.

In the following examples, which are illustrative, Eutectic Mixture 1 was formulated by melting all of the components, adding the bis(p-aminophenyl)methane component to a still and adjusting the temperature of the bis(p-aminophenyl)methane to 90° C. and adding thereto a sufficient amount of a mixture of 2,4-diaminotoluene and 2,3-diaminotoluene (the mixture contained 60 percent by weight 2,3-diaminotoluene and 40 percent by weight 2,4-diaminotoluene) to provide a liquid eutectic containing 60 parts by weight bis(p-aminophenyl)methane and 40 parts by weight of the tolylenediamines.

Eutectic Control 1 was formulated by admixing m-phenylenediamine and bis(p-aminophenyl)methane to provide a liquid eutectic containing 60 percent by weight bis(p-aminophenyl)methane and 40 percent by weight m-phenylenediamine.

Various compositions, formulations of which are noted below, were prepared and tested. The results of these tests are noted below.

Control A—100 parts by weight of diglycidylether of 2,2-bis(p-hydroxyphenyl)propane was heated to 50° C. and admixed with 28.5 parts by weight (a stoichiometric amount) of bis(p-aminophenyl)methane which had been heated to 80° C.

Control B—100 parts by weight of diglycidylether of 2,2-bis(p-hydroxyphenyl)propane was admixed, at room temperature, with 18 parts by weight (a stoichiometric amount) of Eutectic Control 1.

Composition 1—100 parts by weight of diglycidylether of 2,2-bis(p-hydroxyphenyl)propane was admixed at room temperature, with 23.2 parts by weight (a stoichiometric amount) of Eutectic Mixture 1.

Castings were formed from these compositions utilizing a cure cycle of 2 hours at 80° C. and 4 hours at 160° C.

TABLE I

| | Control A | Control B | Composition I |
|---|---|---|---|
| Tensile strength in p.s.i., ASTM 638-64T | 10,300 | 10,100 | 12,800 |
| Tensile elongation, percent, ASTM 638-64T | 2.5 | 2.5 | 3.8 |

Samples of Eutectic Control 1 and Eutectic Mixture 1 were also tested for stability on standing at room temperature about 23° C.

Eutectic Control 1 crystallized after 90 days.

Eutectic Mixture 1 was still stable, no crystallization, after 2 years.

Also, in order to demonstrate the excellent storage life of the polyepoxide compositions, the gel time of a 50 gram sample of Control A and of Composition I were determined immediately after formulation of the compositions.

Control A gelled in less than 30 minutes.

Composition I had not undergone any discernable change after 24 hours.

The storage life of Control B and of Composition I were also compared, at elevated temperature, by heating 50 gram samples of each to 80° C. At 80° C., Control B gelled in 30 minutes while Composition I had not gelled after 60 minutes.

Additional liquid eutectic mixtures, the formulations of which are noted below, were prepared in a manner as described for Eutectic Mixture 1.

Eutectic Mixture 2

| | Grams |
|---|---|
| Bis(p-aminophenyl)methane | 60 |
| 2,3-diaminotoluene | 26 |
| 2,4-diaminotoluene | 14 |

Eutectic Mixture 3

| | |
|---|---|
| Bis(o-aminophenyl)methane | 65 |
| 2,3-diaminotoluene | 24.5 |
| 2,4-diaminotoluene | 10.5 |

Eutectic Mixture 4

| | |
|---|---|
| Bis(m-aminophenyl)methane | 55 |
| 3,4-diaminotoluene | 27 |
| 2,6-diaminotoluene | 18 |

In order to further demonstrate the excellent properties of the liquid eutectics of this invention, the "stabiliy" of Eutectic Mixture 2 was compared to the stabiliy of a liquid eutectic based on m-phenylenediamine. The results of this test are noted below along with the formulation of Eutectic Control 2 which was based on m-phenylenediamine.

Eutectic Control 2 m-phenylenediamine __ 68 grams.
2,3-diaminotoluene __ 20.8 grams.
2,4-diaminotoluene __ 11.2 grams. Stability at 23° C.
Eutectic Mixture 2 __ No discernable crystallization after 48 hours.
Eutectic Control 2 __ Crystallized after 2.5 hours.

Eutectic Mixture 2 and Eutectic Control 2 were also admixed, in a stoichiometric amount, with 100 grams of diglycidyl ether of 2,2-bis(p-hydroxyphenyl)propane and the resultant compositions tested as to shelf life. The procedure used to formulate the compositions was as follows:

Two 100 gram samples of diglycidyl ether of 2,2-bis-(p-hydroxyphenyl)propane were preheated to a temperature of 80° C. One sample was admixed with a stoichiometric amount of Eutectic Mixture 2, which had been preheated to a temperature of 80° C.; the second sample was admixed with a stoichiometric amount of Eutectic Control 2, which had also been preheated to a temperature of 80° C. Each composition was allowed to stand at room temperature, about 23° C.

The composition containing Eutectic Control 2 gelled in 20 minutes.

The composition containing Eutectic Mixture 2 gelled after 45 minutes.

It is to be understood that the disclosure of all references noted herein are incorporated herein by reference.

What is claimed is:

1. A liquid eutectic mixture suitable for curing polyepoxides consisting essentially of (a) about 35 to about 45 parts by weight of a mixture of o-tolylenediamine and m-tolylenediamine wherein the o-tolylenediamine is present in an amount of about 60 to about 70 percent by weight and the m-tolylenediamine is present in an amount of about 30 to about 40 percent by weight, based on the combined weight of the o- and m-tolylenediamine and (b) about 55 to about 65 parts by weight of bis(aminophenyl)-methane.

2. A liquid eutectic mixture as defined in claim 1 wherein the bis(aminophenyl)methane is bis(p-aminophenyl)-methane, bis(o-aminophenyl)methane or bis(m-aminophenyl)methane.

3. A liquid eutectic mixture as defined in claim 1 wherein the bis(aminophenyl)methane is bis(p-aminophenyl)methane.

4. A liquid eutectic mixture as defined in claim 1 wherein the bis(aminophenyl)methane is bis(o-aminophenyl)-methane.

5. A liquid eutectic mixture as defined in claim 1 wherein the bis(aminophenyl)methane is bis(m-aminophenyl)-methane.

6. A liquid eutectic mixture as defined in claim 1 wherein the o-tolylenediamine is 2,3-diaminotoluene.

7. A liquid eutectic mixture as defined in claim 1 wherein the o-tolylenediamine is 3,4-diaminotoluene.

8. A liquid eutectic mixture as defined in claim 1 wherein the m-tolylenediamine is 2,4-diaminotoluene.

9. A liquid eutectic mixture as defined in claim 1 wherein the m-tolylenediamine is 2,6-diaminotoluene.

10. A liquid eutectic mixture as defined in claim 1 consisting essentially of (a) about 40 parts by weight of a mixture of o-tolylenediamine and m-tolylenediamine wherein the o-tolylenediamine is present in an amount of about 65 percent by weight and the m-tolylenediamine is present in an amount of about 35 percent by weight, based on the combined weight of the o- and m-tolylenediamine and (b) about 60 parts by weight of bis(p-aminophenyl)-methane.

11. A liquid eutectic mixture as defined in claim 1 consisting essentially of (a) about 35 parts by weight of a mixture of o-tolylenediamine and m-tolylenediamine wherein the o-tolylenediamine is present in an amount of about 70 percent by weight and the m-tolylenediamine is present in an amount of about 30 percent by weight, based on the combined weight of the o- and m-tolylenediamine and (b) about 65 parts by weight of bis(o-aminophenyl)-methane.

12. A liquid eutectic mixture as defined in claim 1 consisting essentially of (a) about 45 parts by weight of a mixture of o-tolylenediamine and m-tolylenediamine wherein the o-tolylenediamine is present in an amount of about 60 percent by weight and the m-tolylenediamine is present in an amount of about 40 percent by weight, based on the weight of the o- and m-tolylenediamine and (b) about 55 parts by weight of bis(m-aminophenyl)methane.

13. A liquid eutectic mixture as defined in claim 1 consisting essentially of (a) about 40 parts by weight of a mixture of o-tolylenediamine and m-tolylenediamine wherein the o-tolylenediamine is present in an amount of about 65 percent by weight and the m-tolylenediamine is present in an amount of about 35 percent by weight, based on the combined weight of o- and m-tolylenediamine and (b) about 60 parts by weight of bis(p-aminophenyl)-methane.

14. A liquid eutectic mixture as defined in claim 1 wherein the tolylenediamines are present in about 40 parts by weight and the bis(aminophenyl)methane is present in about 60 parts by weight.

15. A liquid eutectic mixture as defined in claim 1 wherein the tolylenediamines are present in about 45 parts by weight and the bis(aminophenyl)methane is present in about 55 parts by weight.

16. A liquid eutectic mixture as defined in claim 1 wherein the tolylenediamines are present in an amount of about 35 parts by weight and the bis(aminophenyl)methane is present in about 65 parts by weight.

References Cited

UNITED STATES PATENTS

| 2,801,229 | 7/1957 | Deltoff et al. | 260—47 EN |
|---|---|---|---|
| 2,853,467 | 9/1958 | Bloom et al. | 260—47 EN |
| 3,427,282 | 2/1969 | Sundholm | 260—47 EN |

RICHARD D. LOVERING, Primary Examiner

I. GLUCK, Assistant Examiner

U.S. Cl. X.R.

252—401; 260—2 EN, 47 EN, 59